(12) United States Patent
Ioka et al.

(10) Patent No.: US 9,905,369 B2
(45) Date of Patent: Feb. 27, 2018

(54) ENERGY STORAGE DEVICE (71) Applicants: GS Yuasa International Ltd., Kyoto-shi (JP); Lithium Energy Japan, Kyoto-shi (JP)

(72) Inventors: Hirotsugu Ioka, Kyoto (JP); Keisuke Anami, Kyoto (JP); Shinya Kitano, Kyoto (JP); Noriyoshi Munenaga, Ritto (JP); Taku Nakamura, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 215 days.

(21) Appl. No.: 14/381,306

(22) PCT Filed: May 20, 2013

(86) PCT No.: PCT/JP2013/003201
§ 371 (c)(1),
(2) Date: Aug. 27, 2014

(87) PCT Pub. No.: WO2013/175760
PCT Pub. Date: Nov. 28, 2013

(65) Prior Publication Data
US 2015/0017521 A1 Jan. 15, 2015

(30) Foreign Application Priority Data
May 22, 2012 (JP) .................. 2012-116738

(51) Int. Cl.
*H01M 2/08* (2006.01)
*H01G 9/08* (2006.01)
(Continued)

(52) U.S. Cl.
CPC ............... *H01G 9/08* (2013.01); *C22C 38/00* (2013.01); *C22C 38/06* (2013.01); *C22C 38/18* (2013.01);
(Continued)

(58) Field of Classification Search
CPC ...... H01M 2/02; H01M 2/0217; H01M 2/024; H01M 2/0426; H01M 2/0434
See application file for complete search history.

(56) References Cited

U.S. PATENT DOCUMENTS 5,455,128 A * 10/1995 Tanaka .................. H01M 2/027
429/147
6,329,081 B1 * 12/2001 Fudanoki ............. C21D 8/0205
148/609
(Continued)

FOREIGN PATENT DOCUMENTS

CN 101677134 A 3/2010
JP 61-22563 A 1/1986
(Continued)

*Primary Examiner* — Eli Mekhlin
(74) *Attorney, Agent, or Firm* — McGinn I.P Law Group, PLLC.

(57) ABSTRACT

Provided is an energy storage device including a container with high productivity and satisfactory corrosion resistance. In the energy storage device including the container housing an electrode assembly having a positive electrode and a negative electrode, and electrolyte solution, the container is made of stainless steel including 0.09% by weight or more aluminum and has welded portions and where the stainless steel is welded.

17 Claims, 4 Drawing Sheets

(51) Int. Cl.
*C22C 38/00* (2006.01)
*C22C 38/18* (2006.01)
*C22C 38/06* (2006.01)
*H01M 2/02* (2006.01)

(52) U.S. Cl.
CPC ......... *H01M 2/024* (2013.01); *H01M 2/0217* (2013.01); *H01M 2/0257* (2013.01)

(56) References Cited

U.S. PATENT DOCUMENTS

| | | | |
|---|---|---|---|
| 7,515,395 B2 | 4/2009 | Morikawa et al. | |
| 2004/0142245 A1* | 7/2004 | Ishikawa | H01M 2/145 |
| | | | 429/247 |
| 2006/0263685 A1* | 11/2006 | Kwon | H01M 2/0408 |
| | | | 429/185 |
| 2007/0065717 A1 | 3/2007 | Morikawa et al. | |
| 2010/0075220 A1 | 3/2010 | Heo | |
| 2011/0236750 A1* | 9/2011 | Kohno | H01M 2/0404 |
| | | | 429/181 |
| 2012/0301779 A1* | 11/2012 | Munenaga | H01M 2/024 |
| | | | 429/178 |

FOREIGN PATENT DOCUMENTS

| | | | | |
|---|---|---|---|---|
| JP | 63193460 A | * | 8/1988 | ............. H01M 2/02 |
| JP | 8-260107 A | | 10/1996 | |
| JP | 9-324246 A | | 12/1997 | |
| JP | 10-237908 A | | 9/1998 | |
| JP | 11-67163 A | | 3/1999 | |
| JP | 2001-35457 A | | 2/2001 | |
| JP | 2001-143667 A | | 5/2001 | |
| JP | 2002-63906 A | | 2/2002 | |
| JP | 2002-198011 A | | 7/2002 | |
| JP | 2003-257384 A | | 9/2003 | |
| JP | 2004-293853 A | | 10/2004 | |
| JP | 2005-187904 A | | 7/2005 | |
| JP | 2005-200729 A | | 7/2005 | |
| JP | 2008-95138 A | | 4/2008 | |
| JP | 2011-70861 A | | 4/2011 | |
| JP | 2011-102423 A | | 5/2011 | |
| JP | 2011-190524 A | | 9/2011 | |

* cited by examiner

ENERGY STORAGE DEVICE

TECHNICAL FIELD

The present invention relates to an energy storage device including a container housing an electrode assembly having a positive electrode and a negative electrode, and electrolyte solution.

BACKGROUND ART

An energy storage device includes a container housing an electrode assembly having a positive electrode and a negative electrode, and electrolyte solution. The container is formed by subjecting stainless steel to high deformation such as deep drawing (see Patent Document 1, for example).

PRIOR ART DOCUMENT

Patent Document

Patent Document 1: JP-A-11-67163

SUMMARY OF THE INVENTION

Problems to be Solved by the Invention

However, in a case where the deep drawing is employed as a method of manufacturing the container made of stainless steel as in the prior-art energy storage device, it makes metal working difficult and reduces productivity in general, though a degree of difficulty of the metal working is different depending on a shape of the container. On the other hand, in a case where a container is produced by welding stainless steel plates, it is easy to manufacture the container in any shape, which enhances the productivity. Therefore, it is desired that the container is formed by welding.

However, in an energy storage device, when the container having welded portions is exposed to a high potential, the welded portions may rust. In other words, in a case where the stainless steel is subjected to the welding, the stainless steel becomes susceptible to corrosion. If the container rusts, metal ion is eluted from the container and deposited on the negative electrode to cause an internal short circuit or the electrolyte solution leaks to the outside. In order to avoid such problems, corrosion resistance is required for the container. The present invention has been made to solve the above-described problems and an object thereof is to provide an energy storage device having a container with high productivity and satisfactory corrosion resistance.

Means for Solving the Problems

To achieve the above object, in accordance with a first aspect of the present invention, there is provided an energy storage device including a container housing an electrode assembly having a positive electrode and a negative electrode, and electrolyte solution, wherein the container is made of stainless steel including 0.09% by weight or more aluminum and has a welded portion where the stainless steel is welded.

The inventors of the present application have found, as a result of hard studies and experiments, that corrosion of the welded portion can be suppressed in the case of the stainless steel including 0.09% by weight or more aluminum, even if the stainless steel is subjected to welding treatment. In this way, it is possible to achieve the energy storage device including the container with high productivity and satisfactory corrosion resistance.

Preferably, the container includes a lid body and a main body connected to the lid body and the main body includes the welded portion.

The main body of the container is normally in contact with an electrode assembly (power generating element) wet with the electrolyte solution. Even if a portion of the main body in contact with the electrolyte solution is welded, it is possible to suppress the corrosion of the welded portion.

Preferably, the stainless steel includes 16 to 30% by weight chromium and 0.3% by weight or less aluminum.

The inventors of the present application have found, as a result of hard studies and experiments, that the chromium content is preferably 16% by weight or higher. On the other hand, the chromium content is preferably 30% by weight or lower and the aluminum content is preferably 0.3% by weight or lower. Therefore, it is possible to form the container of the energy storage device by using the stainless steel having the optimal contents.

Preferably, the container and the electrode assembly are electrically insulated from each other.

When the container and the electrode assembly are insulated from each other, a potential is not applied between the electrode assembly and the container and the corrosion resistance further increases.

Preferably, the main body is in a rectangular parallelepiped shape having long-side faces and short-side faces and at least a part of the welded portion is positioned on the short-side face.

The welded portion is inferior to portions other than the welded portion in corrosion resistance and, as a result, strength of the welded portion may reduce. When the energy storage device is overcharged or left in a high-temperature environment, internal pressure may increase in some cases. In this case, stress due to swelling is applied to the container. If the container of the energy storage device is in the rectangular parallelepiped shape having the long-side faces and the short-side faces, it is the long-side faces having large areas that are susceptible to the swelling and the short-side faces are less susceptible to the swelling. Therefore, if the welded portion is on the short-side face, the welded portion is less susceptible to the stress caused by the swelling and reduction in the strength of the welded portion is less likely to occur.

Advantages of the Invention

According to the present invention, it is possible to achieve the energy storage device including the container with high productivity and satisfactory corrosion resistance.

MODES FOR CARRYING OUT THE INVENTION

With reference to the drawings, energy storage devices according to embodiments of the present invention will be described below. Each of the embodiments described below shows a preferable specific example of the present invention. Numerical values, shapes, materials, components, and disposed positions and manners of connection of the components shown in the following embodiments are merely examples and are not intended to limit the present invention.

Embodiment

Figure 1:
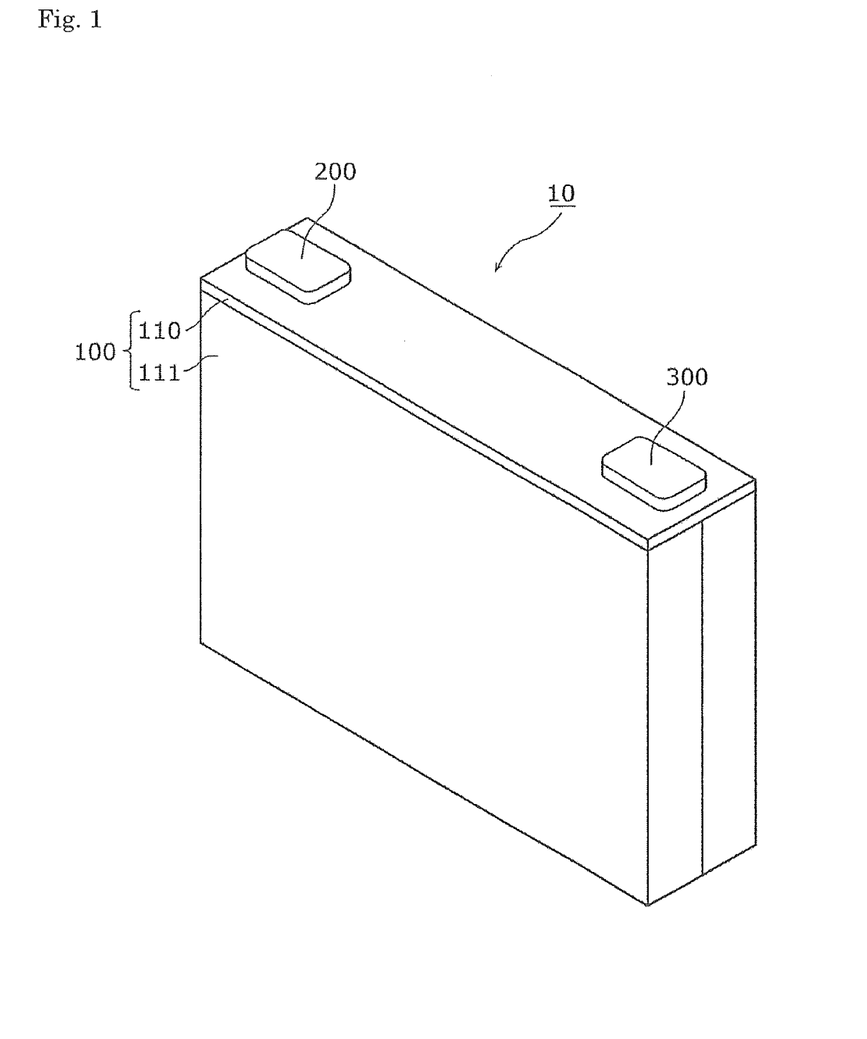
FIG. 1 is a perspective view schematically illustrating an external appearance of an energy storage device according to an embodiment of the present invention.
Figure 2:
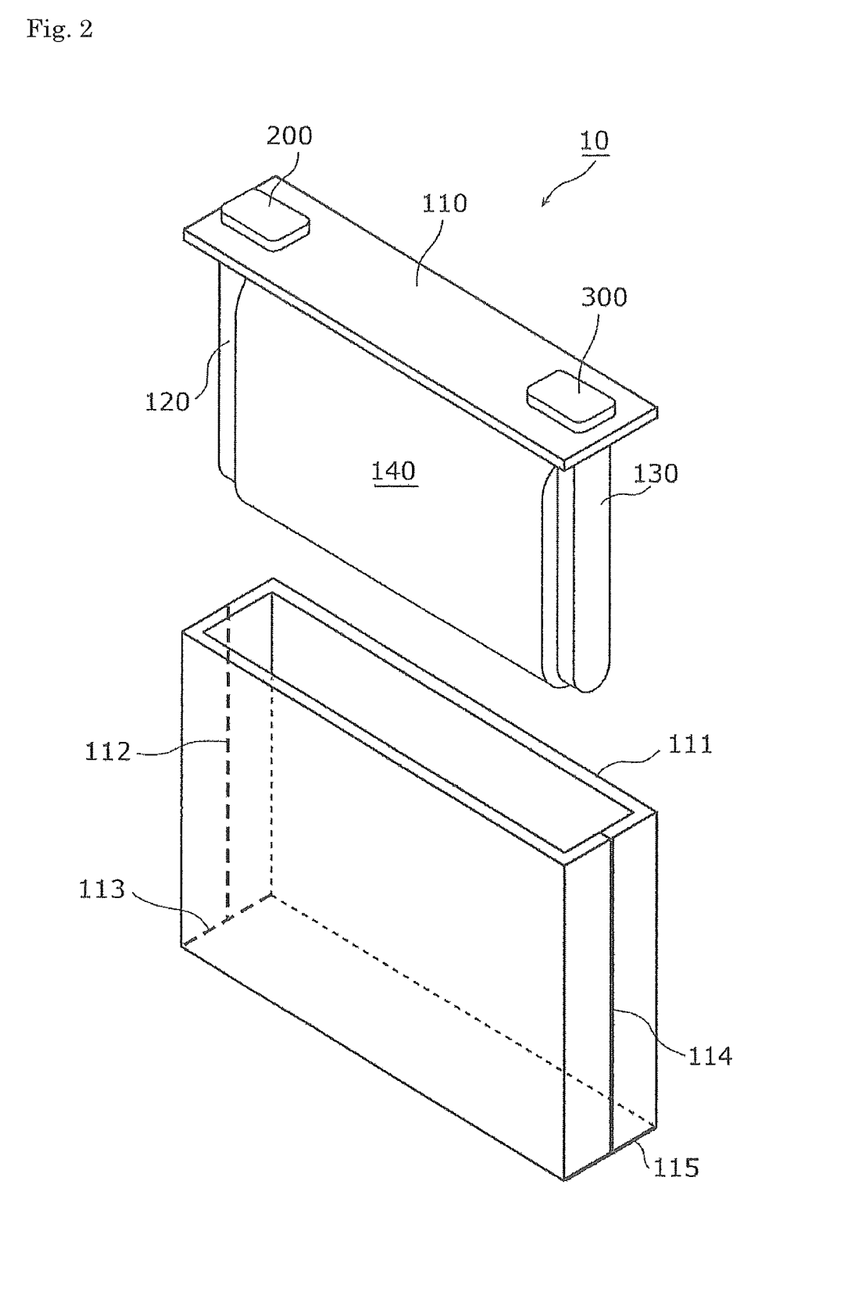
FIG. 2 is a perspective view illustrating a structure when a main body of a container of the energy storage device according to the embodiment of the present invention is separated.

First, a structure of the energy storage device 10 will be described. FIG. 1 is a perspective view schematically illustrating an external appearance of the energy storage device 10 according to the embodiment of the present invention. FIG. 2 is a perspective view illustrating a structure when a main body 111 of a container 100 of the energy storage device 10 according to the embodiment of the present invention is separated.

The energy storage device 10 is a secondary battery and, more specifically, a nonaqueous electrolyte secondary battery such as a lithium ion secondary battery. The energy storage device 10 may be a secondary battery other than the nonaqueous electrolyte secondary battery or a capacitor.

As shown in FIG. 1, the energy storage device 10 includes a container 100, a positive electrode terminal 200, and a negative electrode terminal 300. As shown in FIG. 2, a positive current collector 120, a negative current collector 130, and an electrode assembly 140 are housed in the container 100. Liquid such as the electrolyte solution is encapsulated in the container 100 of the energy storage device 10, though the liquid is not shown in the drawing.

The container 100 is formed by the main body 111 which is a rectangular cylinder made of metal and having a bottom and which has a rectangular parallelepiped outer shape and a lid body 110 which is a metal plate-shaped member for closing an opening of the main body 111. The main body 111 has a rectangular bottom face from long-side portions and short-side portions of which long side faces and short side faces rise, respectively. The inside of the container 100 can be sealed by welding the lid body 110 and the main body 111 to each other after housing the electrode assembly 140 and the like in the container 100. Specifically, the container 100 is made of stainless steel including 0.09% by weight or more aluminum (Al). The stainless steel preferably has a chromium (Cr) content of 16 to 30% by weight with respect to the stainless steel and an aluminum content of 0.3% by weight or lower with respect to the stainless steel.

The main body 111 has welded portions 112, 113, 114, and 115 where the stainless steel is welded. In other words, the welded portions 112 to 115 are welded portions formed by welding portions of the main body 111 made of the stainless steel to each other in manufacture of the main body 111. Specifically, the welded portions 112 and 114 are the welded portions formed on the short-side faces of the main body 111 and the welded portions 113 and 115 are the welded portions formed between the short-side faces and the bottom face of the main body 111.

Figure 3:
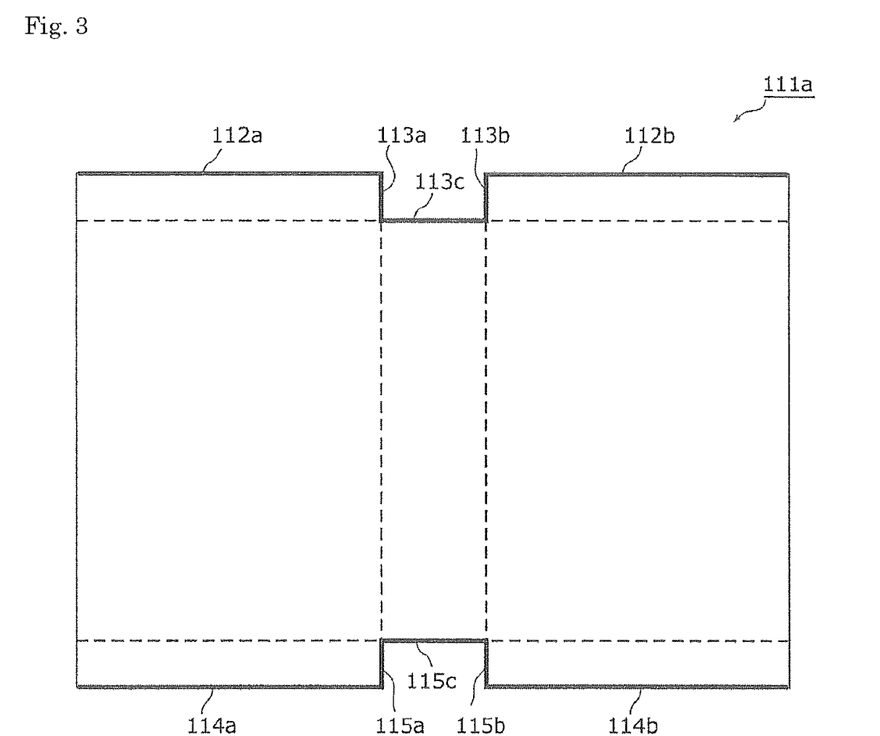
FIG. 3 is a diagram explaining a method of manufacturing the main body of the container of the energy storage device according to the embodiment of the present invention.

Here, a method of manufacturing the main body 111 will be described in detail. FIG. 3 is a diagram explaining the method of manufacturing the main body 111 of the container 100 of the energy storage device 10 according to the embodiment of the present invention. As shown in the drawing, a plate material 111a is a stainless steel plate obtained by developing the main body 111 of the container 100. The plate material 111a is formed by punching out the one stainless steel plate. By folding the plate material 111a along dotted lines in the drawing and welding the plate material 111a, the main body 111 is formed. Specifically, a side 112a and a side 112b of the plate material 111a are welded together and a side 113a, a side 113b, and a side 113c are welded together. Moreover, a side 114a and a side 114b are welded together and a side 115a, a side 115b, and a side 115c are welded together. As a result, the welded portions 112 to 115 are formed on the short-side faces. Especially, the welded portions 112 and 114 are disposed not at side portions of the short side faces but on the faces. When the energy storage device is overcharged or left in a high-temperature environment, the internal pressure may increase in some cases. In this case, it is the long-side faces having large areas that are susceptible to stress caused by swelling and the short-side faces are less susceptible to the stress caused by the swelling. Therefore, the welded portions are preferably formed on the short-side faces, because they are less susceptible to the stress caused by the swelling.

Here, although the container 100 has the lid body 110 and the main body 111 made of the above-described stainless steel in the above description, it is essential only that at least a part of the container 100 be made of the stainless steel with welded portions provided to the part made of the stainless steel. For example, only the main body 111 of the container 100 may be made of the stainless steel or only a part of the main body 111 may be made of the stainless steel. Although the plate material 111a is formed by punching out the one stainless steel plate, the plate material may be formed by a plurality of steel plates. However, the stainless steel plate is preferably formed by one steel plate as described above. This is for reducing the number of times of welding and increasing productivity.

In a case where the welded portions are in contact with the electrolyte solution, it is preferable to use the above-described stainless steel for the welded portions, because pronounced effect can be obtained. The welded portions come in contact with the electrolyte solution, and the metal ion is eluted into the electrolyte solution more frequently, which facilitates corrosion. If the above-described stainless steel is used for the welded portions, the corrosion is suppressed and the more pronounced effect can be obtained than in a case where stainless steel other than the above-described stainless steel is used. Furthermore, it is preferable to use the above-described stainless steel for the welded portions in a case where the welded portions are formed between the opening portion and the bottom face of the main body 111 and in a case where a plurality of welded portions are formed, because pronounced effect can be obtained. This is because areas of contact between the electrolyte solution and the welded portions become large, in the case where the welded portions are formed between the opening portion and the bottom face of the main body 111 and in the case where the plurality of welded portions are formed. Therefore, in a case where the welded portions 112 to 115 are formed on the energy storage device 10 and the energy storage device 10 is disposed in an orientation shown in FIG. 1, the electrolyte solution comes in contact with a lower portion of the main body 111 and therefore a portion including lower portions of the welded portions 112 and 114 and the welded portions 113 and 115 is preferably made of the stainless steel.

Here, the electrolyte solution (nonaqueous electrolyte solution) encapsulated in the container 100 is not limited to a specific kind and can be selected from various kinds of electrolyte solutions as long as the electrolyte solution does not impair performance of the energy storage device 10.

The electrode assembly 140 is a member including a positive electrode, a negative electrode, and a separator and capable of storing electricity. The positive electrode is a long band-shaped positive substrate foil made of aluminum or an aluminum alloy on which a positive active material layer is formed. The negative electrode is a long band-shaped negative substrate foil made of copper or a copper alloy on which a negative active material layer is formed. The separator is a microporous sheet made of resin. Here, as a positive active material used for the positive active material layer and a negative active material used for the negative active material layer, known materials can be used properly. The electrode assembly 140 is formed into an elongated circular shape when seen from the short-side face of the container by winding the negative electrode and the positive electrode disposed in layers with the separator sandwiched therebetween into a flat shape. A flat portion of the flat electrode assembly 140 faces inner faces of the long-side faces of the main body 111. If the energy storage device is used for a long period of time, the electrode assembly may swell due to deterioration and a thickness of the flat portion of the electrode assembly 140 increases. In this case, stress due to the swelling of the electrode assembly is received by the long-side faces of the main body 111 and it is preferable that the welded portions are formed at the short-side faces which are less likely to receive the stress due to the swelling.

It is possible to obtain more conspicuous effect when an open circuit voltage of the positive electrode of the electrode assembly 140 is 4.0 V or higher with respect to a lithium potential in a case where the energy storage device 10 is in a fully charged state. When the container 100 and the positive electrode come in contact with each other and the container 100 is exposed to a voltage of 4.0 V or higher, it is preferable to use the above-described stainless steel, because the conspicuous effect can be obtained. The open circuit voltage of the positive electrode is a potential difference between the positive electrode open circuit potential and the lithium potential, and the positive electrode open circuit potential is a potential of the positive electrode of the energy storage device 10 when a state in which the energy storage device 10 is electrically separated from an external circuit (no load is applied between the positive electrode and the negative electrode) has continued for a sufficient duration.

The positive electrode terminal 200 is an electrode terminal electrically connected to the positive electrode of the electrode assembly 140, and the negative electrode terminal 300 is an electrode terminal electrically connected to the negative electrode of the electrode assembly 140. In other words, the positive electrode terminal 200 and the negative electrode terminal 300 are metal electrode terminals for leading out electricity stored in the electrode assembly 140 to a space outside the energy storage device 10 and introducing electricity into a space in the energy storage device 10 in order to store the electricity in the electrode assembly 140. The positive electrode terminal 200 and the negative electrode terminal 300 are mounted to the lid body 110 disposed above the electrode assembly 140.

The positive current collector 120 is a member with electric conductivity and rigidity, is disposed between the positive electrode of the electrode assembly 140 and a side wall of the main body 111 of the container 100, and is electrically connected to the positive electrode terminal 200 and the positive electrode of the electrode assembly 140. The positive current collector 120 is made of aluminum or the aluminum alloy similarly to the positive substrate foil of the electrode assembly 140.

The negative current collector 130 is a member with electric conductivity and rigidity, is disposed between the negative electrode of the electrode assembly 140 and a side wall of the main body 111 of the container 100, and is electrically connected to the negative electrode terminal 300 and the negative electrode of the electrode assembly 140. The negative current collector 130 is made of copper or the copper alloy similarly to the negative substrate foil of the electrode assembly 140.

Next, effect exerted by the energy storage device 10 having the container 100 made of the above-described stainless steel will be described in detail.

Examples

Examples of the energy storage device 10 having the container 100 will be described below. Example 1 described below relates to the energy storage device 10 according to the above-described embodiment. Experiments were carried out under the same conditions for Examples 1 to 3 and Comparative Examples 1 to 3 described below except a chromium content and an aluminum content in the container. Specifically, the experiments were carried out for six kinds of stainless steels (stainless steels A to F) having different chromium contents and aluminum contents as shown in Table 1 on the assumption that the battery container made of stainless steel was exposed to a positive electrode potential in the following manner.

TABLE 1

| Kind of stainless steel | Cr content (% by weight) | Al content (% by weight) |
| --- | --- | --- |
| Stainless steel A | 17.0 | 0.09 |
| Stainless steel B | 14.3 | 0.10 |
| Stainless steel C | 16.0 | 0.12 |
| Stainless steel D | 16.0 | 0.06 |
| Stainless steel E | 11.0 | 0.05 |
| Stainless steel F | 13.2 | 0.06 |

Here, stainless steels A to C were stainless steels having aluminum contents of 0.09 to 0.12% by weight and stainless steels D to F were stainless steels having aluminum contents of 0.05 to 0.06% by weight. Stainless steels A, C, and D had chromium contents higher than 16.0% by weight and stainless steels B, E, and F had chromium contents lower than 16.0% by weight. A metal plate sample for each of these stainless steels A to F was produced by welding two stainless steel plates by butt welding.

A glass electrolysis cell was used as a test cell, the metal plate sample to which a terminal was connected was used as a working electrode and lithium metal was used for a counter electrode and a reference electrode. For electrolyte solution, 1MLiPF$_6$ was used as electrolyte and a mixture of ethylene carbonate, dimethyl carbonate, and ethyl methyl carbonate at a volume ratio of 3:2:5 was used as solvent. Then, cyclic voltammetry was carried out for the test cell by using a potentio-galvanostat (SI1287 manufactured by Solartron Group Ltd). Scanning potentials were in a range of 2.5 V to 4.2 V and the cyclic voltammetry was carried out for 300 times. A test temperature was 25° C. Then, by using an inductively coupled plasma (ICP) emission spectrometer (IRIS AP manufactured by Nippon Jiyaareru H K.K. (current corporate name: Thermo Fisher Scientific K.K.), ICP emission spectrometry was carried out for the electrolyte solution in the test cell after the test and quantity of Fe element was determined.

Results of the experiments carried out as described above are shown in Table 2. In other words, in Table 2 shown below, current values (at the time of 4.2 V) in 10th cycle and 300th cycle of the cyclic voltammetry, elution amounts of Fe out to the electrolyte solution after the end of the 300th cycle, and current values at 3.5 V or 4.0 V in 300th cycle are compared between the metal plate samples of stainless steels A to F. The current value at 3.5 V or 4.0 V refers to a current value passed through a unit area of the electrode when the voltage is 3.5 V or 4.0 V with respect to the potential of the lithium metal. In other words, in a case where the current value is large, it means that metal elution due to corrosion is occurring.

TABLE 2

|  | Kind of stainless steel | Current Value in 10th Cycle (mA/cm$^2$) | Current Value in 300th Cycle (mA/cm$^2$) | Current Value at 3.5 V (mA/cm$^2$) | Current Value at 4.0 V (mA/cm$^2$) | Fe Elution Amount (g/L) |
|---|---|---|---|---|---|---|
| Example 1 | Stainless steel A | 0.00 | 0.01 | 0.00 | 0.01 | 0.004 |
| Example 2 | Stainless steel B | 0.01 | 2.41 | 0.01 | 1.81 | 0.076 |
| Example 3 | Stainless steel C | 0.00 | 0.00 | 0.00 | 0.01 | 0.002 |
| Comparative Example 1 | Stainless steel D | 6.78 | 13.73 | 0.01 | 13.73 | 0.241 |
| Comparative Example 2 | Stainless steel E | 9.18 | 21.40 | 0.13 | 15.18 | 0.393 |
| Comparative Example 3 | Stainless steel F | 6.99 | 13.70 | 0.09 | 13.70 | 0.320 |

Figure 4:
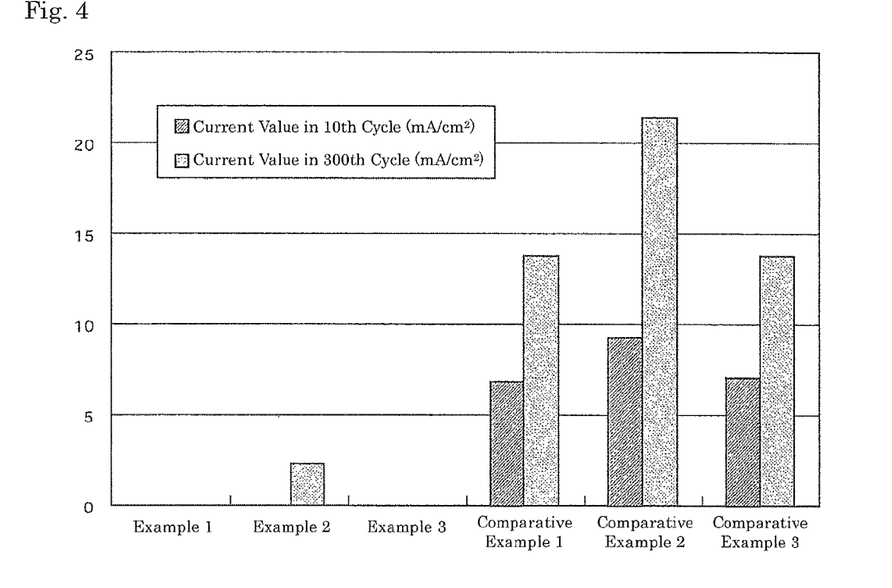
FIG. 4 is a diagram explaining effect exerted by the energy storage device according to the embodiment of the present invention.
Figure 5:
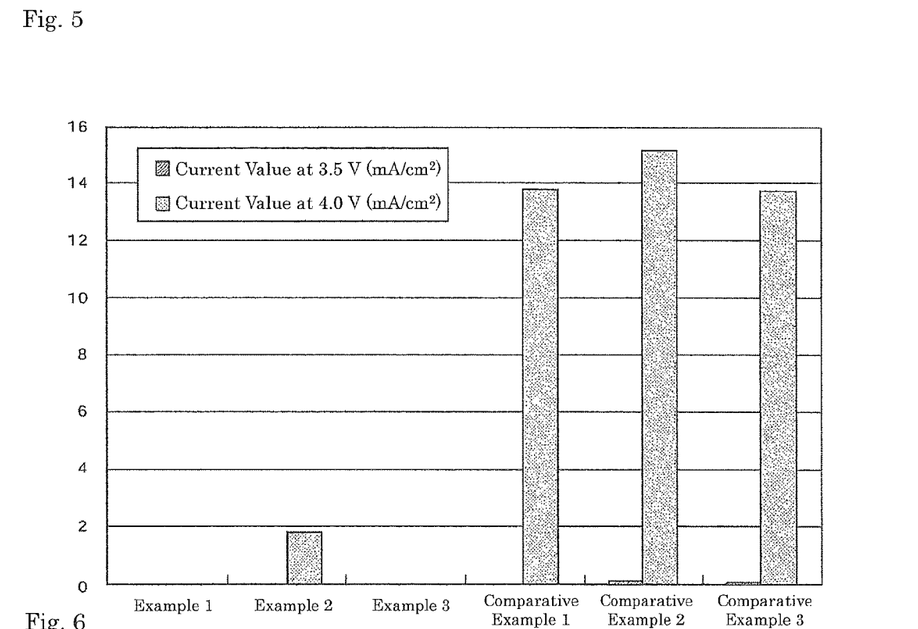
FIG. 5 is a diagram explaining effect exerted by the energy storage device according to the embodiment of the present invention.
Figure 6:
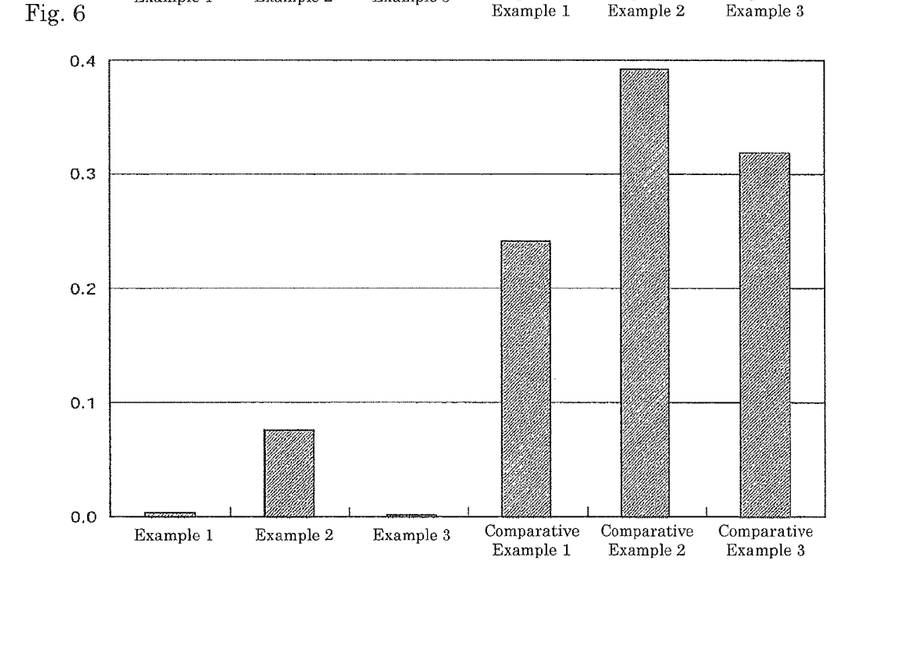
FIG. 6 is a diagram explaining effect exerted by the energy storage device according to the embodiment of the present invention.

Here, Examples 1 to 3 show the current values in the 10th cycle and the 300th cycle, the current values at 3.5 V and 4.0 V, and the Fe elution amounts for the metal samples of stainless steels A to C. Comparative Examples 1 to 3 show the above data for the metal samples of stainless steels D to F. FIGS. 4 to 6 are diagrams explaining effect exerted by the energy storage device 10 according to the embodiment of the present invention. Specifically, FIG. 4 is a graph comparing the current values in the 10th cycle and the 300th cycle in Examples 1 to 3 and Comparative Examples 1 to 3 in Table 2 described above. FIG. 5 is a graph comparing the current values at 3.5 V and 4.0 V in Examples 1 to 3 and Comparative Examples 1 to 3 in Table 2 described above. FIG. 6 is a graph comparing values of the Fe elution amounts in Examples 1 to 3 and Comparative Examples 1 to 3 in Table 2 described above.

Stainless steel D of Comparative Example 1 is a kind of steel used for prior-art containers manufactured by deep drawing. When the above experiments were carried out for the metal plate of stainless steel D without a welded portion, current values (at the time of 4.2 V) in the 10th cycle and the 300th cycle and current values at 3.5 V or 4.0 V in the 300th cycle were 0.00 mA/cm$^2$, 0.00 mA/cm$^2$, 0.01 mA/cm$^2$, and 0.00 mA/cm$^2$, respectively. This example shows that, when the stainless steel of Comparative Example 1 is used, corrosion occurs in a case of a container with a welded portion while an electric current hardly flows and corrosion does not occur in a case of a container without a welded portion.

As shown in Table 2 and FIGS. 4 to 6 described above, the current values in the 10th cycle and the 300th cycle, the current values at 4.0 V, and the Fe elution amounts were much smaller in Examples 1 to 3 (stainless steels A to C) than in Comparative Examples 1 to 3 (stainless steels D to F). Therefore, in a case where stainless steel has a welded portion, it is possible to suppress corrosion of the welded portion by using stainless steel having the aluminum content of 0.09% by weight or higher. The current values in the 300th cycle, the current values at 4.0 V, and the Fe elution amounts were much smaller in Examples 1 and 3 (stainless steels A and C) than in Example 2 (stainless steel B). In other words, it is preferable that the chromium content is 16.0% by weight or higher, because the corrosion can be suppressed for a long time period.

A chromium coating is formed on the stainless steel to suppress the corrosion of the stainless steel. Therefore, the higher the chromium content, the longer period the corrosion can be suppressed for. However, the high chromium content causes reduction in toughness and workability and therefore the chromium content is preferably 30% by weight or lower. The factor that suppressed the corrosion is assumed to be formation of a corrosion-resistant coating by the contained aluminum, which exerts effect of suppressing elution of the stainless steel. Therefore, the higher the aluminum content, the more the corrosion can be suppressed. However, the high aluminum content causes a surface defect in manufacturing the stainless steel and therefore the aluminum content is preferably 0.3% by weight or lower.

As shown in Table 2 and FIG. 5 described above, in Comparative Examples 1 to 3, the current values at 3.5 V are low, while the current values at 4.0 V are high. This shows that the corrosion occurs less frequently when the voltage to which the stainless steel forming the container of the battery is exposed is 3.5 V, while the metal elution due to the corrosion occurs frequently when the voltage is 4.0 V. In contrast, in Examples 1 to 3, both the current values at 3.5 V and the current values at 4.0 V are low. In other words, whether the voltage to which the stainless steel forming the container of the battery is 3.5 V or 4.0 V, occurrence of the corrosion is suppressed. Therefore, by using stainless steels A to C (Examples 1 to 3), it is possible to satisfactorily suppress the metal elution due to the corrosion, even when the potential of the positive electrode exceeds 4.0 V with respect to the lithium potential.

As described above, the energy storage device 10 according to the embodiment of the present invention includes the container 100 which is made of the stainless steel including 0.09% by weight or more aluminum and which has welded portions where the stainless steel is welded. Here, the inventors of the present application have found, as a result of hard studies and experiments, that corrosion of the welded portions can be suppressed in the case of the stainless steel including 0.09% by weight or more aluminum, even if the stainless steel is subjected to welding treatment. Therefore, if the container 100 is formed by welding, it is possible to suppress the corrosion of the welded portions by using the stainless steel for the welded portions. In this way, it is possible to achieve the energy storage device 10 including the container 100 with high productivity and satisfactory corrosion resistance.

The inventors of the present application have found, as a result of hard studies and experiments, that the corrosion of the welded portions can be suppressed in the case of the stainless steel having the aluminum content of 0.09% by weight or higher, even when the open circuit voltage of the positive electrode of the energy storage device 10 is 4.0 V or higher with respect to the lithium potential. Therefore, it is possible to achieve the energy storage device 10 including the container 100 with satisfactory corrosion resistance at the welded portions, even when the open circuit voltage is 4.0 V or higher.

The energy storage device 10 has the welded portions 112 to 115 at the main body 111 of the container 100. In other words, the main body 111 of the container 100 is normally in contact with the electrode assembly wet with the electrolyte solution. Even if the portions of the main body in contact with the electrolyte solution are welded, it is possible to suppress the corrosion of the welded portions.

The stainless steel forming the container 100 of the energy storage device 10 has the chromium content of 16 to 30% by weight and the aluminum content of 0.3% by weight or lower. Here, if the stainless steel has a low chromium content, oxidation resistance tends to lower when the stainless steel is exposed to a severe oxidizing condition for a long time period or repeatedly. Therefore, the inventors of the present application have found, as a result of hard studies and experiments, that the chromium content is preferably 16% by weight or higher. On the other hand, the high chromium content causes reduction in toughness and workability and therefore the chromium content is preferably 30% by weight or lower. The high aluminum content causes the surface defect in manufacturing the stainless steel and therefore the aluminum content is preferably 0.3% by weight or lower. Therefore, it is possible to form the container 100 of the energy storage device 10 by using the stainless steel having the optimal contents.

Other Embodiments

In the above embodiment, a state of electrical connection between the container and the electrode assembly is not especially limited. The container may be connected to a positive electrode side of the electrode assembly to be at a positive electrode potential. The container and the electrode assembly may be electrically insulated from each other. It is preferable that the container and the electrode assembly are insulated from each other, because a potential is not applied between the electrode assembly and the container and the corrosion resistance further increases.

Although the shape of the electrode assembly 140 is the elongated circle in the above embodiment, it may be a circle or an ellipse. The shape of the electrode assembly 140 is not limited to a wound shape and may be a shape formed by laminating flat plate-shaped plates.

INDUSTRIAL APPLICABILITY

The present invention can be applied to the energy storage device having the container with high productivity and satisfactory corrosion resistance.

DESCRIPTION OF REFERENCE SIGNS 10 energy storage device
100 container
110 lid body
111 main body
111a plate material
112, 113, 114, 115 welded portion
112a, 112b, 113a to 113c, 114a, 114b, 115a to 115c side
120 positive current collector
130 negative current collector
140 electrode assembly
200 positive electrode terminal
300 negative electrode terminal

The invention claimed is:

1. An energy storage device comprising:
a container comprising a main body and a lid body connected to the main body, and housing an electrode assembly including a positive electrode and a negative electrode, and electrolyte solution,
wherein the container is made of stainless steel including 0.09% by weight or more aluminum,
wherein the main body includes a welded portion where the stainless steel is welded, and
wherein the main body further comprises:
a long-side face
a short-side face which is joined to the long-side face, at least a part of the welded portion being positioned on the short-side face; and
a bottom face which is joined to the short-side face by the welded portion, an end of the welded portion being formed at a corner formed by the long-side face, the short-side face and the bottom face.

2. The energy storage device according to claim 1, wherein the stainless steel includes 16 to 30% by weight chromium and 0.3% by weight or less aluminum.

3. The energy storage device according to claim 1, wherein the container and the electrode assembly are electrically insulated from each other.

4. The energy storage device according to claim 1, wherein the main body is in a rectangular parallelepiped shape.

5. The energy storage device according to claim 4, wherein the main body further comprises a first folded portion connecting the long-side face of the main body to the bottom face of the main body.

6. The energy storage device according to claim 5, wherein the main body further comprises a second folded portion connecting the short-side face of the main body and the long-side face of the main body.

7. The energy storage device according to claim 6, wherein the main body further comprises an other long-side face, and a third folded portion connecting the short-side face of the main body and the other long-side face of the main body.

8. The energy storage device according to claim 7, wherein the short-side face includes a first side portion connected to the long-side face by the second folded portion, and a second side portion connected to the other long-side face by the third folded portion, and the welded portion joins the first and second side portions.

9. The energy storage device according to claim 8, wherein a width of the first side portion of the short-side face is substantially equal to a width of the second side portion of the short-side face.

10. The energy storage device according to claim 8, wherein the main body further comprises an other short-side face including a first side portion connected to the long-side face by a fourth folded portion, and a second side portion connected to the other long-side face by a fifth folded portion, and the welded portion joins the first and second side portions of the other short-side face.

11. The energy storage device according to claim 1, wherein an open circuit voltage of the positive electrode is 4.0 V or greater with respect to a lithium potential.

12. The energy storage device according to claim 1, wherein the main body further comprises an other long-side face which is joined to the short-side face, and
wherein the welded portion extends from the corner formed by the long-side face, the short-side face and the bottom face, to an other corner formed by the other long-side face, the short-side face and the bottom face.

13. An energy storage device comprising:
a container comprising:
a lid body; and
a main body connected to the lid body and comprising:
a plurality of faces; and
a welded portion being formed one of between the plurality of faces and in a face of the plurality of faces; and an electrode assembly housed in the container and electrically insulated from the container,
wherein the main body comprises stainless steel including aluminum in a range of 0.09% and 0.3% by weight and chromium in a range from 16% to 30%, and
wherein the plurality of faces comprises:
a first long-side face
a first short-side face which is joined to the first long-side face, at least a part of the welded portion being positioned on the first short-side face; and
a bottom face which is joined to the first short-side face by the welded portion, an end of the welded portion being formed at a corner formed by the first long-side face, the first short-side face and the bottom face.

14. The energy storage device according to claim 13, wherein the first short-side face comprises first and second sides joined by the welded portion, and
wherein the plurality of faces further comprises a second short-side face comprising first and second sides joined by the welded portion.

15. The energy storage device according to claim 14, wherein the first long-side face is connected to the first side of the first short-side face by a first folded portion, and connected to the first side of the second short-side face by a second folded portion.

16. The energy storage device according to claim 15, wherein the plurality of faces further comprises:
a second long-side face which is connected to the second side of the first short-side face by a third folded portion, and connected to the second side of the second short-side face by a fourth folded portion.

17. The energy storage device according to claim 16, wherein the bottom face is joined to the first and second short-side faces by the welded portion, joined to the first long-side face by a fifth folded portion, and joined to the second long-side face by a sixth folded portion.

* * * * *